United States Patent
Kapur et al.

(10) Patent No.: US 10,255,158 B2
(45) Date of Patent: Apr. 9, 2019

(54) MONITORING AND DIAGNOSTICS OF BUSINESS TRANSACTION FAILURES

(71) Applicant: ORACLE INTERNATIONAL CORPORATION, Redwood Shores, CA (US)

(72) Inventors: Kunal Kapur, San Carlos, CA (US); Constantinos Papadopoulos, Nicosia (CY); Timothy Lay, San Mateo, CA (US); Rajendra Inamdar, North Chelmsford, MA (US); Anthony G. Vlatas, Brookline, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 612 days.

(21) Appl. No.: 14/053,922

(22) Filed: Oct. 15, 2013

(65) Prior Publication Data
US 2015/0106659 A1    Apr. 16, 2015

(51) Int. Cl.
*G06F 11/00* (2006.01)
*G06F 11/36* (2006.01)

(52) U.S. Cl.
CPC ...... *G06F 11/3612* (2013.01); *G06F 11/3644* (2013.01); *G06F 2201/865* (2013.01)

(58) Field of Classification Search
CPC ............. G06F 11/3466; G06F 11/3636; G06F 11/366; G06F 17/30507; G06F 2201/865; G06F 11/3644; G06F 11/0766; G06F 11/3065; G06F 11/3624; G06F 2201/86; G06F 2209/481
See application file for complete search history.

(56) References Cited

U.S. PATENT DOCUMENTS

| | | | | |
|---|---|---|---|---|
| 5,559,313 A | * | 9/1996 | Claus | G06Q 20/105 |
| | | | | 235/380 |
| 5,628,016 A | * | 5/1997 | Kukol | G06F 8/445 |
| | | | | 717/114 |
| 6,158,049 A | | 12/2000 | Goodwin et al. | |
| 6,314,558 B1 | * | 11/2001 | Angel | G06F 11/3612 |
| | | | | 714/35 |
| 6,317,868 B1 | | 11/2001 | Grimm et al. | |
| 6,385,766 B1 | | 5/2002 | Doran et al. | |
| 6,397,382 B1 | * | 5/2002 | Dawson | G06F 11/3636 |
| | | | | 711/138 |

(Continued)

OTHER PUBLICATIONS

Oracle Business Transaction Management; "Business Transaction Management", An Oracle White Paper, May 2010; pp. 1-13; Oracle Corporation; Redwood Shores, CA, USA.

(Continued)

*Primary Examiner* — Loan L. T. Truong
(74) *Attorney, Agent, or Firm* — Tarolli, Sundheim, Covell & Tummino LLP

(57) ABSTRACT

Systems, methods, and other embodiments associated with reconfiguring applications and monitoring exceptions are described. In one embodiment, a computer implemented method analyzes executable code of an application and identifies an exception handling clause. The method modifies the executable code by reconfiguring the exception handling clause to call a monitoring agent and pass information associated with an exception that occurs during execution of the executable code.

24 Claims, 4 Drawing Sheets

(56) References Cited

U.S. PATENT DOCUMENTS

| | | | |
|---|---|---|---|
| 6,493,834 B1* | 12/2002 | Bates | G06F 11/3664 714/35 |
| 6,754,888 B1 | 6/2004 | Dryfoos et al. | |
| 6,760,903 B1* | 7/2004 | Morshed | G06F 11/3466 717/130 |
| 6,865,736 B2 | 3/2005 | Holmberg et al. | |
| 6,918,053 B1* | 7/2005 | Thatte | G06Q 10/10 714/16 |
| 7,137,105 B2* | 11/2006 | Madsen | G06F 11/3466 717/128 |
| 7,168,068 B2* | 1/2007 | Dawson | G06F 11/3636 714/E11.21 |
| 7,367,025 B1* | 4/2008 | Nikolov | G06F 11/3624 714/E11.207 |
| 7,379,999 B1 | 5/2008 | Zhou | |
| 7,421,682 B2* | 9/2008 | Viehland | G06F 11/3644 714/35 |
| 7,519,944 B2* | 4/2009 | Havin | G06F 8/447 717/106 |
| 7,596,780 B2* | 9/2009 | Selitrennikoff | G06F 9/4812 717/124 |
| 7,784,044 B2 | 8/2010 | Buban et al. | |
| 7,814,477 B2 | 10/2010 | Sun et al. | |
| 7,818,721 B2* | 10/2010 | Sundararajan | G06F 11/3644 717/130 |
| 7,886,281 B2* | 2/2011 | Smith | G06F 11/3636 714/37 |
| 7,895,580 B1* | 2/2011 | Nikolov | G06F 11/3624 717/118 |
| 8,037,459 B2* | 10/2011 | Mavinakayanahalli | G06F 11/3644 717/128 |
| 8,141,052 B2 | 3/2012 | Guarraci | |
| 8,141,056 B2* | 3/2012 | Prasadarao | G06F 11/3644 717/130 |
| 8,225,317 B1* | 7/2012 | Chiueh | G06F 9/455 713/164 |
| 8,799,882 B2 | 8/2014 | Tarditi, Jr. | |
| 8,806,448 B2* | 8/2014 | Jeong | G06F 11/3644 717/124 |
| 9,052,980 B2* | 6/2015 | Hulick, Jr. | G06F 11/3612 |
| 9,064,042 B2* | 6/2015 | Meagher | G06F 11/3466 |
| 9,092,568 B2* | 7/2015 | Rhee | G06F 11/3604 |
| 9,129,062 B1* | 9/2015 | Adams | G06F 11/3644 |
| 9,372,693 B2 | 6/2016 | Bradbury | |
| 2001/0047510 A1* | 11/2001 | Angel | G06F 11/3612 717/128 |
| 2002/0065885 A1* | 5/2002 | Buonanno | G06Q 10/10 709/205 |
| 2002/0095661 A1 | 7/2002 | Angel | |
| 2002/0169999 A1* | 11/2002 | Bhansali | G06F 8/44 714/26 |
| 2002/0199179 A1* | 12/2002 | Lavery | G06F 9/4843 717/158 |
| 2003/0018681 A1* | 1/2003 | Subramanian | G06F 9/3861 718/102 |
| 2003/0018961 A1* | 1/2003 | Ogasawara | G06F 8/4441 717/158 |
| 2003/0046676 A1 | 3/2003 | Cheng et al. | |
| 2003/0056201 A1* | 3/2003 | Degenaro | G06F 8/4442 717/130 |
| 2003/0149960 A1* | 8/2003 | Inamdar | G06F 11/362 717/118 |
| 2004/0015435 A1* | 1/2004 | Solomon | G06Q 10/0631 705/39 |
| 2004/0015600 A1* | 1/2004 | Tiwary | G06F 11/3414 709/234 |
| 2004/0093595 A1 | 5/2004 | Bilange | |
| 2004/0107416 A1 | 6/2004 | Buban | |
| 2004/0168156 A1* | 8/2004 | Hundt | G06F 9/4486 717/130 |
| 2004/0237067 A1 | 11/2004 | Sun et al. | |
| 2004/0268310 A1* | 12/2004 | Morgan | G06F 11/3664 717/124 |
| 2005/0039190 A1* | 2/2005 | Rees | G06F 11/3419 719/316 |
| 2005/0138111 A1 | 6/2005 | Aton | |
| 2005/0198621 A1* | 9/2005 | Tillmann | G06F 11/3624 717/128 |
| 2006/0143231 A1* | 6/2006 | Boccasam | G06F 17/30507 |
| 2006/0161891 A1 | 7/2006 | Ehnebuske et al. | |
| 2006/0282828 A1* | 12/2006 | Mehta | G06F 9/4812 717/130 |
| 2007/0006167 A1* | 1/2007 | Luk | G06F 8/443 717/130 |
| 2007/0055966 A1* | 3/2007 | Waddington | G06F 8/72 717/144 |
| 2008/0052696 A1* | 2/2008 | Pradadarao | G06F 11/3644 717/158 |
| 2008/0155510 A1* | 6/2008 | Zheltov | G06F 11/3644 717/130 |
| 2008/0215922 A1* | 9/2008 | Cheng | G06F 11/366 714/39 |
| 2009/0007081 A1* | 1/2009 | Lau | G06F 8/51 717/136 |
| 2009/0271231 A1* | 10/2009 | Buddenbaum | G06Q 40/04 705/29 |
| 2011/0010690 A1* | 1/2011 | Howard | G06F 8/456 717/120 |
| 2011/0078656 A1* | 3/2011 | Tsuta | G06F 8/20 717/110 |
| 2011/0107307 A1* | 5/2011 | Liu | G06F 11/3664 717/125 |
| 2012/0131392 A1* | 5/2012 | Bendig | G06F 8/34 714/48 |
| 2013/0066955 A1 | 3/2013 | Neel | |
| 2013/0104107 A1 | 4/2013 | De Smet | |
| 2013/0298106 A1* | 11/2013 | Darcy | G06F 8/41 717/114 |
| 2013/0339975 A1* | 12/2013 | Busaba | G06F 9/44 718/104 |
| 2014/0089907 A1* | 3/2014 | Cabillic | G06F 8/41 717/147 |
| 2014/0109111 A1* | 4/2014 | Gupta | G06F 11/0766 719/318 |
| 2014/0165035 A1* | 6/2014 | Campbell | G06F 8/72 717/121 |
| 2014/0237453 A1 | 8/2014 | Hulick, Jr. | |
| 2014/0298299 A1 | 10/2014 | Balan | |
| 2015/0046389 A1* | 2/2015 | Dhayapule | G06F 17/30563 707/602 |

OTHER PUBLICATIONS

Oracle Corporation; "Managing Exceptions in Distributed Applications", An Oracle White Paper, Mar. 2010; pp. 1-13; Oracle Corporation; Redwood Shores, CA, USA.

U.S. Patent and Trademark Non-Final Office Action in co-pending U.S. Appl. No. 14/548,980, filed Nov. 20, 2014; dated Apr. 8, 2016.

U.S. Patent and Trademark Final Office in co-pending U.S. Appl. No. 14/548,980, filed date Nov. 20, 2014; dated Sep. 2, 2016.

* cited by examiner

MONITORING AND DIAGNOSTICS OF BUSINESS TRANSACTION FAILURES

BACKGROUND

Complex distributed systems and applications include software running on multiple servers and may include integrated products or software libraries from multiple vendors. Components of the system are located on networked computers that interact and coordinate their actions to work properly. The system may also interact with third party systems to complete certain transactions.

For example, consider an online shopping application where a customer selects items to purchase and initiates a "submit order" action to buy the items. To the customer, the process appears simple but behind the scenes, the process can be very complex. Many function calls may be made to third party systems and/or calls to different types of systems with multiple technologies. There may be a function call to a credit card system to verify the customer's credit card and available funds, a call to an inventory database to verify that the purchased items are in stock, a call to a shipping system to get shipping information for delivering the purchased items, and other calls needed to process the order. All of the actions performed to complete the "submit order" are referred to as a business transaction. The individual systems and the online shopping application need to work together to properly process the business transaction.

Sometimes an error occurs somewhere during the business transaction causing the transaction to fail. The distributed structure of the system makes it difficult to locate and identify the root cause of the error. In computing, certain kinds of errors or other failures generate "exceptions." Exceptions are conditions or events that disrupt the normal flow of executing instructions in a software application and are a common part of many computing environments. Often, the root cause of an environment, configuration or security issue, or a bug or unsupported use in a piece of program code manifests itself in the form of an exception. When an exception occurs during runtime, it can cause unpredictable effects, such as a failed business transaction, or cause a transaction to take longer/shorter than usual to complete.

Exceptions in distributed applications can also take the form of system or application errors (for example, invalid data in requests, transport-level errors, network failure, inaccurate responses) or business errors (for example, excessive weight of shipment, bad credit for a premier customer). Unfortunately, it is usually the customer (the consumer/user of a distributed application) who experiences exceptions before anyone within the enterprise. Common examples include generic messages on an e-commerce Website (e.g., "Sorry, unable to process request at this time"), delayed orders, and/or lost packages.

Each occurrence of an exception can disrupt the customer's experience up front and may have a direct impact on the business. Therefore, managing exceptions proactively is important to any business.

Typically, programmers attempt to handle foreseeable exceptions by writing program code in the application that performs certain actions when the exception occurs during runtime. Such code is called an exception handler. However, the manner in which the exception is handled is dependent to how well the programmer writes the exception handling code. Sometimes an exception does not get logged by the respective code at all. Poorly handled exceptions become very difficult to identify when they occur during runtime, which makes it difficult to locate and identify the root cause of the exception. Even with well handled exceptions, a challenge is that they often end up scattered in multiple log files with varying hard to correlate formats, spread out on different machines. This makes it difficult to know that an exception happened. Even when it is known that an exception happened, it's hard to know where the exception was logged. Moreover, it's even harder to know the business transaction it happened as part of, and to determine its criticality and impact to the business. Typically, complex and time consuming debugging procedures are manually performed to identify the above. In some circumstances, the error conditions that caused the exception cannot be recreated, making it very difficult to identify and correct the error.

SUMMARY

In one embodiment, a computer implemented method is disclosed that comprises analyzing, by at least a processor, executable code of an application and identifying an exception handling clause; and modifying, by at least the processor, the executable code by reconfiguring the exception handling clause to call a monitoring agent and pass data associated with an exception that occurs during execution of the executable code.

In another embodiment, the computer implemented method further comprises associating a business transaction with the exception after the exception occurs during execution of the executable code.

In another embodiment, the associating further comprises: monitoring, by the monitoring agent, the execution of the executable code and collecting data from business transactions; in response to receiving the call from the exception handling clause that includes the data associated with the exception, analyzing context from the collected data and determining a business transaction that corresponds to the exception; and associating the exception to the corresponding business transaction.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems and methods are described herein that provide a mechanism to capture and report exceptions/throwables that occur during business transactions of an executing application. Catching and reporting exceptions allows application developers and administrators to more easily identify the root cause of a failed transaction. In one embodiment, the present system and method provides the capability to capture exceptions that occur within a business transaction, which provides end-to-end monitoring and diagnostics of business transaction failures.

Even in applications that have exception handling code, which is programmed to log messages about a problem, it is very difficult for a reader of the logs to manually associate the exception/problem in the log with the transaction that the failure was part of (since the transaction is at a higher level and could span multiple servers). It is also very difficult to go the other way around, e.g., associate the transaction to the exceptions that happened in the context of the transaction. In one embodiment, the present system and method determines and generates information that shows the relationship between a business transaction and an exception that occurred as part of the transaction by associating or linking them to each other.

It will be appreciated that the present system and method is applicable to distributed transactions and production monitoring with low performance overhead.

Figure 1:
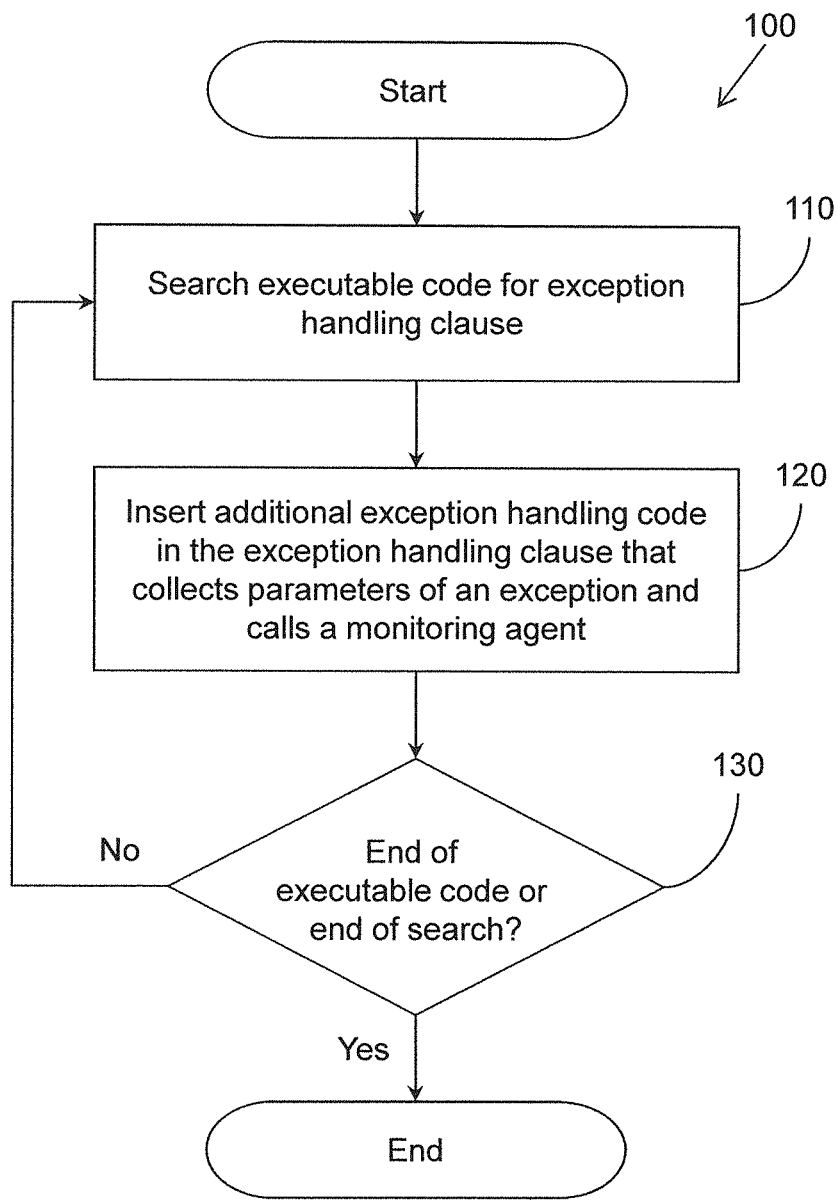
FIG. 1 illustrates one embodiment of a method associated with reconfiguring an application to customize exception handling code.

With reference to FIG. 1, one embodiment of a computer implemented method 100 is shown that programmatically modifies an application to have more reliable exception handling techniques. For example, the method reconfigures the software application by modifying exception handling code within the application and adds code for capturing and reporting exceptions in a consistent and reliable manner.

Method 100 initiates and a target application is selected for modification. In one embodiment, the target application is in an executable form (e.g., bytecode, binary files, machine code, etc.) and maybe one file or a collection of files/modules. At 110, the executable code is searched and analyzed for an exception handling clause within the executable code. Depending on the type of code or programming language of the source code, there is typically a defined syntax, a label, or instruction that is assigned to an exception handling clause in the code. The computer implemented method 100 is configured to search for and identify the designated code that represents an exception handling clause. Particular examples will be discussed with reference to FIG. 2.

With continued reference to FIG. 1, at 120, when the exception handling clause is found, additional exception handling code is inserted/embedded into the exception handling clause in the executable code. For example, bytecode instrumentation is a technique to inject code into bytecode of an application. In one embodiment, the added code is configured (i) to collect information about an exception when the exception occurs during execution of the executable code, and (ii) to transmit the information about the exception to a monitoring agent. For example, executable code that calls the monitoring agent is inserted that passes information about the exception, which may include parameters or other data from the exception, to the monitoring agent. At 130, after the code is inserted, the method checks whether there is more executable code to search or whether the search is otherwise to terminate (e.g., by a user, etc).

If the method continues, it returns to 110 where the method repeats the process to find other exception handling clauses in the executable code and at least inserts code that calls the monitoring agent into each found clause. The method can be configured to modify selected types of exception handling clauses or modify all the clauses. In one embodiment, the method searches the executable code that is active and loaded in memory for execution. In Java, a class would be searched while the class is being loaded in memory, which happens when the class is first accessed by the application. Thus not all executable code from an application needs to be searched; just the code that gets loaded into memory to be used. Also, modifying the code in memory does not permanently change the application since the original code is maintained on disk and is not modified. In another embodiment, the method searches the executable code that is stored on disk and modifies the code on the disk.

Overall, the executable application is reconfigured so that exception handling clauses are made to perform the same or similar action in response to an exception (e.g., call the monitoring agent with data) in addition to performing its original exception handling code. In this way, exception handling is performed in a consistent manner so that the data from every exception is collected/stored/reported in a uniform way at a known location (e.g., the monitoring agent). Collecting exception data in a known manner provides visibility into what happened during runtime and helps to identify the root cause of a failed business transaction.

Among other things, modifying the exception handling clauses as described herein rectifies situations where an exception handling clause is not properly written such that the original code fails to handle the exception in a useful way. For example, the original clause might be written such that the clause (a) might be empty (has no code), (b) does not properly log data, (c) logs the data in an unknown or inaccessible location (e.g., in proprietary storage device/file) that makes the collected data useless, (d) suppresses the root cause exception (e.g. a new exception is thrown inside a catch block, thus suppressing the original exception), or (e) has other defects in the program code. In another embodiment, the method is configured to associate a caught exception with the business transaction during which the exception occurred. This is described in more detail with reference to FIG. 3.

In other embodiments, the method 100 can search for and identify all relevant exception handling clauses within the executable code. The additional exception handling code may be inserted into every identified clause or into a number of selected exception handling clauses. The inserted exception handling code may be the same code for every clause or may be different code inserted for different exception handling clauses. For example, based on the type of exception being handled, different code is selected from a library of code and inserted based on the type so that the type of exception is handled appropriately. With the above techniques, the present system/method can automatically capture exceptions for business transactions that span multiple containers.

Figure 2:
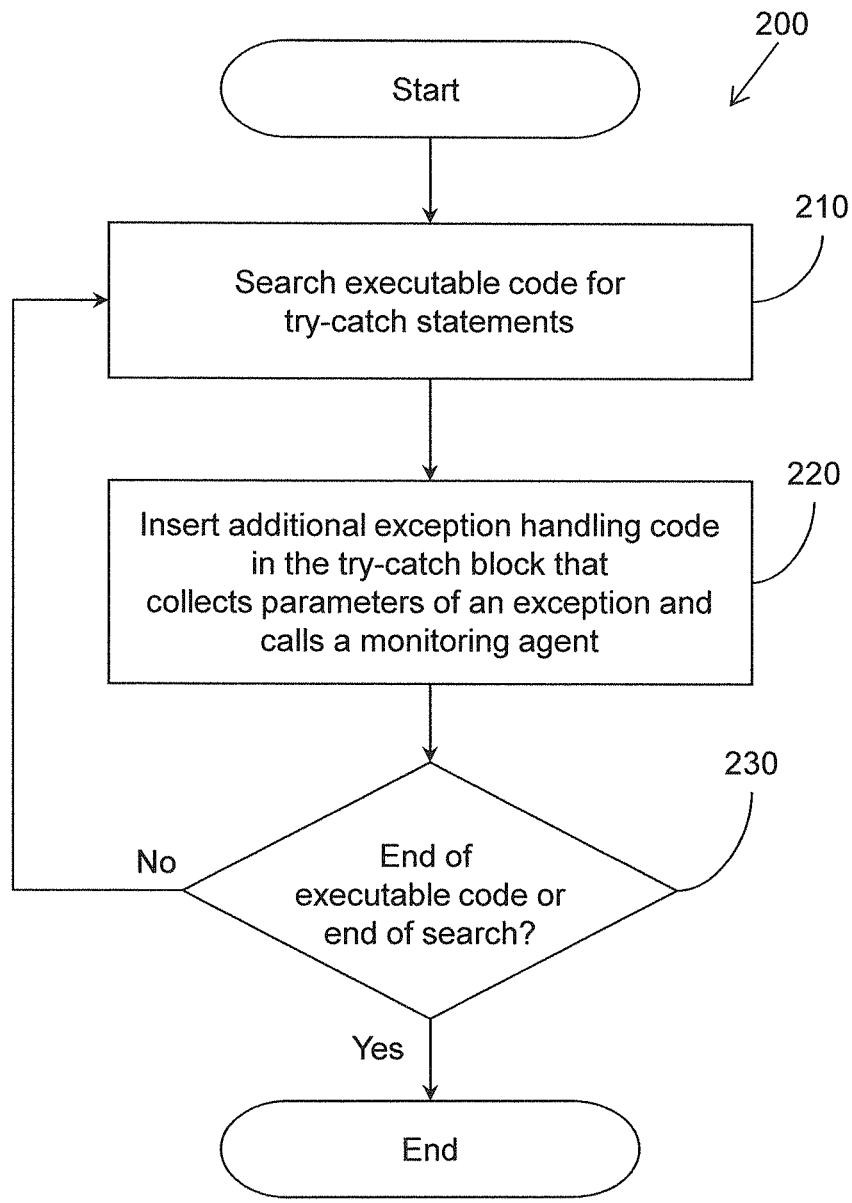
FIG. 2 illustrates another embodiment of a method associated with reconfiguring a Java application to customize exception handling code.

With reference to FIG. 2, another embodiment is shown of a method 200 associated with reconfiguring an application to customize exception handling code. Method 200 is discussed based on the application being a Java application.

In programming languages that support exception handlers, the code for exception handlers is labeled/identified with some type of marker statement that identifies the exception handling block. The method 200 can be configured to identify the particular marker statement. Several handler blocks can follow each other, and each block can specify which exception types it handles and what name it uses for the exception object. In some cases, the code may have nested exception blocks (e.g., one or more blocks that are within another block).

In Java, "try-catch" statements identify exception handling blocks. The "try-catch" statement is used to catch exceptions that might be thrown as a program executes. A programmer would write try-catch statements as part of the source code of the application so the program does not crash if the exception occurs.

For example, the "try-catch" statement (in source code syntax) has this general form:

```
try
{
    code that can throw an exception
}
catch (exception-type name)
{
    code executed when exception is thrown
}
```

The code/statements that might throw an exception are within the "try" block. The code in the "catch" block is executed when the particular type of exception occurs (e.g., "catch_type"). When the catch block completes execution, the processing continues after the catch block. Try-Catch blocks allow the application to continue executing after an exception is caught and the catch block finishes execution. Conversely, if the exception was never "caught," the exception would, in most cases, cause the application to fail in an ungraceful manner. In general, the fact that an exception occurred (even though it was caught) indicates (in most cases) that something went wrong with the processing. This could result in a negative impact on the application, despite the fact that the exception was caught.

Each catch block is an exception handler and handles the type of exception indicated by its argument. The argument type, Exception-Type, declares the type of exception that the handler can handle and is the name of a class that inherits from the "Throwable" class. The handler can refer to the exception with "name."

The catch block contains code that is executed if and when the exception handler is invoked. The Java runtime system invokes the exception handler when the handler is the first one in the call stack whose Exception-Type matches the type of the exception thrown. The system considers it a match if the thrown object can legally be assigned to the exception handler's argument.

With continued reference to FIG. 2, at 210, the method searches for try-catch statements in the executable code. As mentioned, the above example of a try-catch statement is shown in source code syntax whereas the compiled, executable version of the application would be in byte-code format. Thus method 200 is configured to identify the byte-code that represents the try-catch statements (how to search for and identify catch blocks is described in more detail below). Once identified and located, at 220, additional code is inserted in the identified try-catch block as previously described under FIG. 1, block 120. In this case, a call to the monitoring agent is inserted as part of the catch block code. At 230, the method repeats for the next identified catch block or ends if the search is complete. In another embodiment, source code may be searched for catch blocks, modified with the inserted code, and recompiled.

In one embodiment, a pseudo code representation of the code insertion may be as follows:

```
catch (exception-type name)
{
    Inserted code to call monitoring agent (information passed)
    Original code executed when exception is thrown
}
```

As previously discussed, the new code is inserted in the executable application and is in executable form itself (e.g., byte-code, machine code). Thus, when the application is executing and the catch block is triggered by the occurrence of the exception it is programmed to handle, the inserted code is executed (which calls the monitoring agent) and the original code of the catch block is executed (if any) afterwards. After the call is made to the monitoring agent, execution flow returns to the catch block and continues processing the next instructions. In another embodiment, the inserted code may be inserted in other portions of a try-catch block such that the order of processing may be different than shown above.

By inserting new code, which calls the monitoring agent, the application is reconfigured to force each modified catch block to pass diagnostic data about the exception (such as the exception object) to the monitoring agent as directed by the inserted code. As such, the executable application is reconfigured to provide diagnostic data for every exception that occurs during application execution even when the application did not originally provide such data.

The diagnostic data is valuable since it provides customers/users easy and instant visibility into the root cause of a failed business transaction when the failure manifests itself in the form of a Java exception. Without the present feature, Java exceptions that cause business transactions to fail can be notoriously hard to track down due to poor error-handling code or other design choices or constraints. For example, Java exceptions may be completely swallowed (e.g. empty catch block), or the root cause exception suppressed (e.g. new exception is thrown in a catch block, suppressing the original exception), or conditionally (based on log configuration) and partially logged to a proprietary or hard to find/use log file. By reconfiguring each catch block in an application as described herein, these situations are reduced or eliminated. Every catch block would respond to its caught exception by including a uniformed response (calling the monitoring agent) regardless of what its original code does.

In another embodiment, the monitoring agent is configured to associate a caught exception with its corresponding business transaction that the exception was a part of. Exception reporting (e.g., calling the monitoring agent) is useful in general. However, exception reporting becomes especially valuable when the system is able to associate the exception with the higher level application constructs (business transactions, etc). Without the association, a user cannot identify which business transaction caused the exception, or conversely, which exceptions happened as part of a given business transaction. A more detailed description of the associating feature is provided with reference to FIG. 3.

In one embodiment, the monitoring agent is an application configured to monitor other executing applications. For example, the monitoring agent may be a business transaction management (BTM) component. BTM is the practice of managing information technology (IT) from a business transaction perspective. It provides a tool for tracking the flow of transactions across IT infrastructure, in addition to detection, alerting, and correction of unexpected changes in business or technical conditions. BTM provides visibility into the flow of transactions across infrastructure tiers, including a dynamic mapping of the application topology. In another embodiment, the monitoring agent is any utility that collects and reports data from exceptions. The monitoring agent is a separate piece of code from the executable application but it typically runs under the same process as the application being monitored. In another embodiment, the monitoring agent may simply be a log file used to store the data collected from exceptions.

After the call is made to the monitoring agent, the caught exception is passed to the monitoring agent. In one embodiment, the agent chooses whether the exception should be reported based on filtering logic. The filtering logic, for example, may apply selected conditions to the exception data to determine an importance level. For example, it could report the exception if the catch block's execution happened in the context of a business transaction, or in the context of other important application information. The monitoring agent is configured to determine the application business transaction context, since its primary job is to monitor business transactions.

Therefore, upon receiving the exception, the monitoring agent can make this determination, based on the surrounding context that is stored (e.g. other application information it has intercepted on the same thread, etc). Reporting the exception may include one or more actions, for example, capturing the call stack and other exception information, reporting this information to a server-side BTM component along with the regular business transaction information, and then showing this correlated information to the user on a UI. It could also log the problem to a file, send an email describing the problem to an administrator, generate a message, and/or other desired actions. If the monitoring agent decides not to report the exception, then the runtime overhead for the particular execution is negligible since the above actions do not need to be performed.

Filtering Exceptions

In general, any complex application can have a large volume of exceptions even in a healthy environment where all transactions are completing successfully. In one embodiment, the present system/method is configured with filtering logic to address this by avoiding false positives (e.g., exceptions that do not terminate a transaction) through a combination of techniques for filtering exceptions (not limited to any order):

1. Injecting/instrumenting only relevant executable code (e.g., searching and injecting into a class that is loaded into memory). Other classes are not relevant until loaded for execution or are not relevant because they are Java runtime system classes.

2. Capturing and reporting exceptions that are within the context of a business transaction. If an exception is determined to not be part of a business transaction (e.g., exception is part of a different thread), the exception is filtered out and not reported (e.g., exceptions that happened outside of the scope of a business transaction are ignored/discarded by the filter). Processing overhead is reduced by not reporting such exceptions.

3. Comparing exceptions in failed transactions against baseline healthy transactions, and applying domain knowledge to narrow or identify the root cause exception.

4. Other logic to ignore benign exceptions, adaptive based on feedback (e.g., data from previous exceptions).

In one embodiment, one of the above filtering techniques may be applied or more than one may be applied.

Associating Exceptions with a Business Transaction

Figure 3:
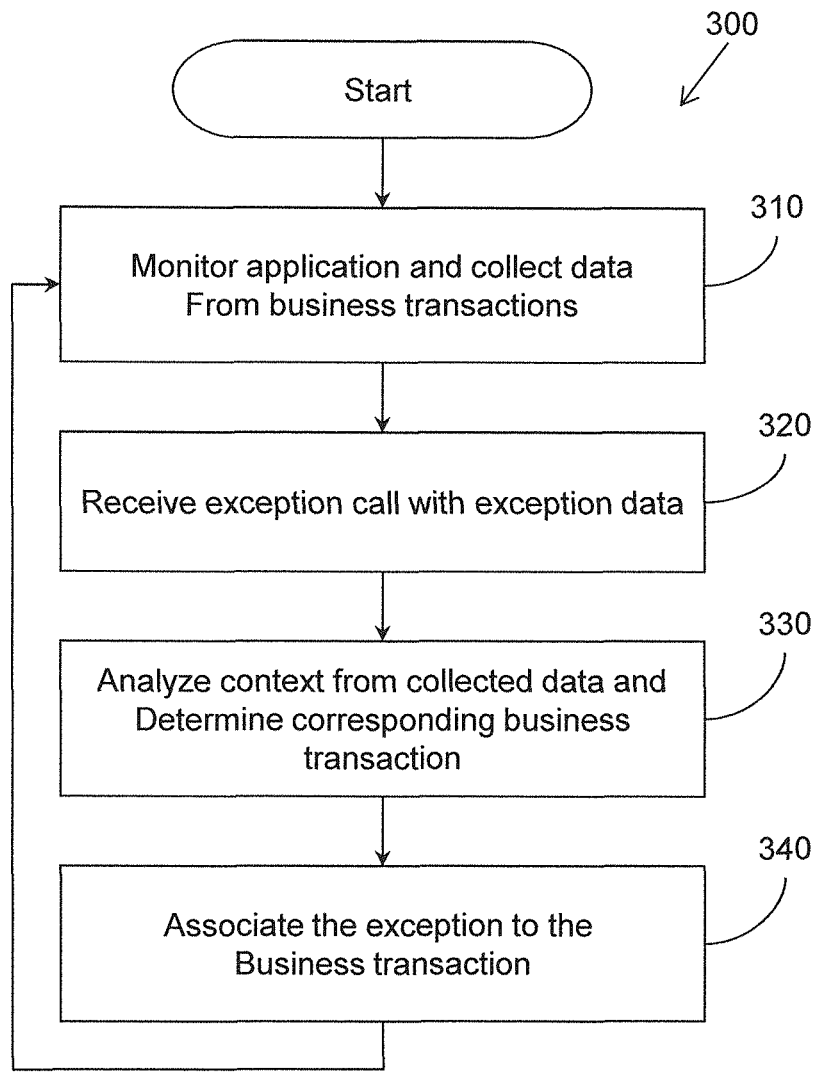
FIG. 3 illustrates an embodiment of a method for associating an exception with a business transaction.

With reference to FIG. 3, one embodiment is shown of a method 300 that associates a collected exception with a business transaction that the exception was part of (or occurred in). Method 300 is discussed from the perspective of the monitoring agent and is performed by the monitoring agent. The actions of method 300 are performed subsequent to the actions of FIG. 1, which modify a monitored application to call the monitoring agent.

As previously explained, the monitoring agent is configured to monitor and collect data about business transactions from a monitored application (block 310). During runtime, there may be thousands of business transactions occurring simultaneously from the application being monitored. At 320, when the monitoring agent receives an exception call containing exception information, the agent analyzes the surrounding context (e.g. thread) from the collected data to determine which business transaction to associate the exception with (block 330). At 340, the exception and the corresponding business transaction are associated together, for example, by linking them together, identifying associated pairs in a table or file, or other manner using a data structure to represent corresponding/associated objects.

Recall that the exception call is the call made to the monitoring agent from an exception handling clause (e.g., a call from a catch block). The call is part of the additional code that was inserted into the monitored application as described in FIG. 1. Configuring the monitoring agent to correlate exception information with the collected data from business transactions allows the exception to be associated with its corresponding business transaction. This allows a user to more easily track down and determine the exceptions thrown in the context of a business transaction (which could have likely caused the transaction to fail). It can also allow the user to see the vice-versa of this relationship; i.e. to go from a caught exception (or in an aggregated view where many exceptions are aggregated in one, e.g. based on their type, to go from a type of exception), to the business transactions in which such exceptions occurred. Such associations or linking were not possible with prior exception handling techniques that only reported exceptions without associating them to the higher-level application artifacts.

In one embodiment, linking captured exceptions with business transactions may be performed as follows. Consider two "types" of data: type (a) business transaction context and type (b) exceptions:

Data type a) Business Transaction Context. The monitoring agent collects local data about the business transaction (e.g. Username, Order#, etc.). Typically, the monitoring agent collects such data by monitoring interesting code that relates to such processing within the monitored application. The monitoring may occur using bytecode instrumentation (which embeds, into the application, calls to the agent that pass data during execution of the application) or other means for collecting execution data from the application. The business transaction management BTM server-side also has broader global (vs. local) business transaction context that is assembled by stitching together the local contexts the BTM receives from the monitoring agents (e.g., there could be multiple monitoring agents running). The BTM server-side may also have access to additional metadata context (that it has extracted from other sources or the user may have provided), such as the name of the business transaction etc.

Data type b) Exceptions. The monitoring agent collects information about caught exceptions as described above (note: even within the same monitored application, this could be the same monitoring agent that collects Data (a) or a different agent; in this embodiment it is the same agent).

In one embodiment, the monitoring agent stores information on a thread of execution whenever the agent gets called for data of type (a). For example, data collected from different threads are organized and stored in a distinguishable manner from each thread. Then when/if the agent gets called about data of type (b)—i.e. data about exceptions—the monitoring agent looks up the stored information on the thread of execution that corresponds to the same thread that generated the exception. That way the agent can associate the business transaction context information that has been stored for a thread with the exceptions that happened in its context.

In another embodiment, a thread ID (or other unique identifier ID) or correlation algorithm could be used to do the above correlation out of band. Furthermore, different correlation approaches could be used. For example, even if data (a) and data (b) are on different threads, the agent may be configured to decide to 'link' them together if the agent deems that the exception is related to the business transaction in any way (e.g., based on one or more predetermined conditions or thresholds for association).

As an example, consider an HTTP Servlet that executes on Java thread X. Further consider that the monitoring agent is able to intercept Servlet executions using bytecode instrumentation that passes execution data (business transaction data) to the agent via embedded call statements. Thus, when the Servlet gets hit, the agent gets called. When the agent gets called, the agent receives and stores selected business transaction data from the Servlet (e.g. the Servlet URL, customer ID, other information about the Servlet, etc. . . . ) on the running thread of execution (thread X). Java provides a 'thread local storage' mechanism that allows the agent to store the data collected from thread X, which is separated from other threads.

Then later, suppose an exception gets thrown as part of the same thread X. The exception's catch block is intercepted as described in this disclosure, and thus the monitoring agent gets called for that exception. At that point, the agent determines that the exception came from thread X (from the data passed) and the agent identifies and looks up the corresponding thread's local storage (which in this case was previously populated with transaction information about the Servlet executing on thread X). The agent associates this business transaction information about the Servlet from the local storage of thread X with the exception that was just reported from thread X.

The business transactions are assembled by stitching together all the calls of data type (a) that call each other either directly or indirectly (this call sequence can span multiple machines). The assembly of calls from data type (a) happens at the monitoring tool's server-side and the approach for doing that assembly is beyond the scope of this disclosure. However, in general, one approach for stitching is to intercept and inject a unique ID in each remote call in the transaction so that the unique ID makes it over to the other side (e.g., using Oracle Execution Context ID (ECID)). Then, this ID can be used to correlate the caller/callee. This can be performed for every 'hop' in the transaction thus building a full transaction flow. Other algorithms for stitching of transactions may be used that are known to one of ordinary skill in the art. Using any of these stitching algorithms, the system is able to correlate instances of transactions, and also capture rich Business Context at every hop. Combining the stitching with the ability to capture exceptions as disclosed herein, the system can correlate each exception with the rich Business Context, and provide a more comprehensive end-to-end view of the Business Transaction and its exceptions. Once the transaction is assembled, since every data type 'a' knows the exceptions that happened in its context (e.g., in the same thread as the transaction). These exceptions can then be presented to the user in the context of data 'a', or in the context of the overall transaction.

Note that other segmentations could be used, e.g. presenting the exceptions in the context of a monitored server since for each monitored server, the monitoring tool knows all the calls of type (a) that happened within that server, and consequently, the data type (b) exceptions attached to them. Thus the reconfigured application and the monitoring agent provide end-to-end monitoring and diagnostics for business transaction failures. Exceptions are captured, analyzed to identify the root cause exception, automatically correlated across multiple servers participating in a distributed business transaction, and reported within the context of the business transaction they occurred in.

Searching for Exception Handling Clauses

The following description provides an example for searching and identifying exception handling clauses in executable code, in one embodiment. For example, the description corresponds to actions that may be taken by the searching block 110 of FIG. 1 or the searching block 210 of FIG. 2.

In particular, the following description will be discussed based on Java and searching executable bytecode for catch blocks. Of course, as stated previously, other programming languages may be used and the present system/method may be configured to search for other types of exception handling clauses.

By way of background, in Java bytecode, each try-catch block is represented by an 'exception handler'. An exception handler specifies:

(1) A program counter (pc) of where the "try" block starts and ends (start_pc, end_pc).
(2) The type of exception that the exception handler is able to handle (catch_type)—e.g. java.lang.NullPointerException, etc.
(3) A program counter (pc) of where the "catch" block starts (handler_pc).

Each Java method has an array of these exception handlers, called an 'exception_table', since there could be many catch blocks within a method. A method in Java is a block of statements that has a name and can be executed by calling (also called invoking) the method from some other place in the program.

With knowledge of this configuration, in one embodiment, the monitoring agent is configured to locate try-catch blocks. When the monitoring agent analyzes a class file byte-code, while inside a method, the agent is configured to identify addresses associated with try-catch blocks. For example, when the agent encounters an address that is the start of a matching catch block (handler_pc) in the exception table, the agent determines that a catch block has been found and inserts the new exception handling code there (e.g., the code that calls the monitoring agent as described above).

In one embodiment, the monitoring agent is configured to perform instrumentation filtering to decide which catch blocks to modify and which catch blocks not to modify. If the agent decides not to modify a catch block, then the agent will not get called when that catch block gets invoked as a result of an exception.

Some examples of filtering conditions to determine which catch blocks to select and instrument may be as follows:

(a) Only modify catch blocks for classes loaded by certain classloaders (e.g. do not modify catch blocks loaded by core Java classloaders, since those are core Java classes that may not be interesting or relevant to business transactions).

(b) Only modify catch blocks within certain methods. As the agent inspects the methods of the class as described earlier, the agent is configured to only instrument catch blocks belonging to selected methods. The selected methods may be predetermined and specified in advance. Other methods may be designated to be ignored and thus not instrumented.

(c) Only modify catch blocks that match a certain exception type. For example, only modify catch blocks handling java.lang.NullPointerException (or ignore catch blocks handling that type of exception). The agent can look at the "catch_type" field (described earlier) and make this determination.

The following is an example expression that gives instructions to the agent on which catch blocks to instrument. These expressions are read by the agent (e.g. from a file) at the beginning, before any class gets inspected:

```
before:catch(+java.lang.Throwable) AND \
(NOT catch(+java.lang.ClassCastException)) AND \
(NOT within(com.oracle.samples.Foo bar(...)))
```

In the expression, "java.lang.Throwable" is the parent of all exceptions. "before:" tells the agent to inject the code at the beginning of the catch block (but an agent can inject code "after" if desired, i.e. at the end of the catch block). The above expression basically says: Instrument all catch blocks except those: (a) handling a specific type of exception (in the above example a ClassCastException or its subclasses); and (b) within the specified method (in the above example Foo.bar( ))—the scope could also be at the class, or package level. It will be appreciated that multiple catch/within expressions can be combined.

Figure 4:
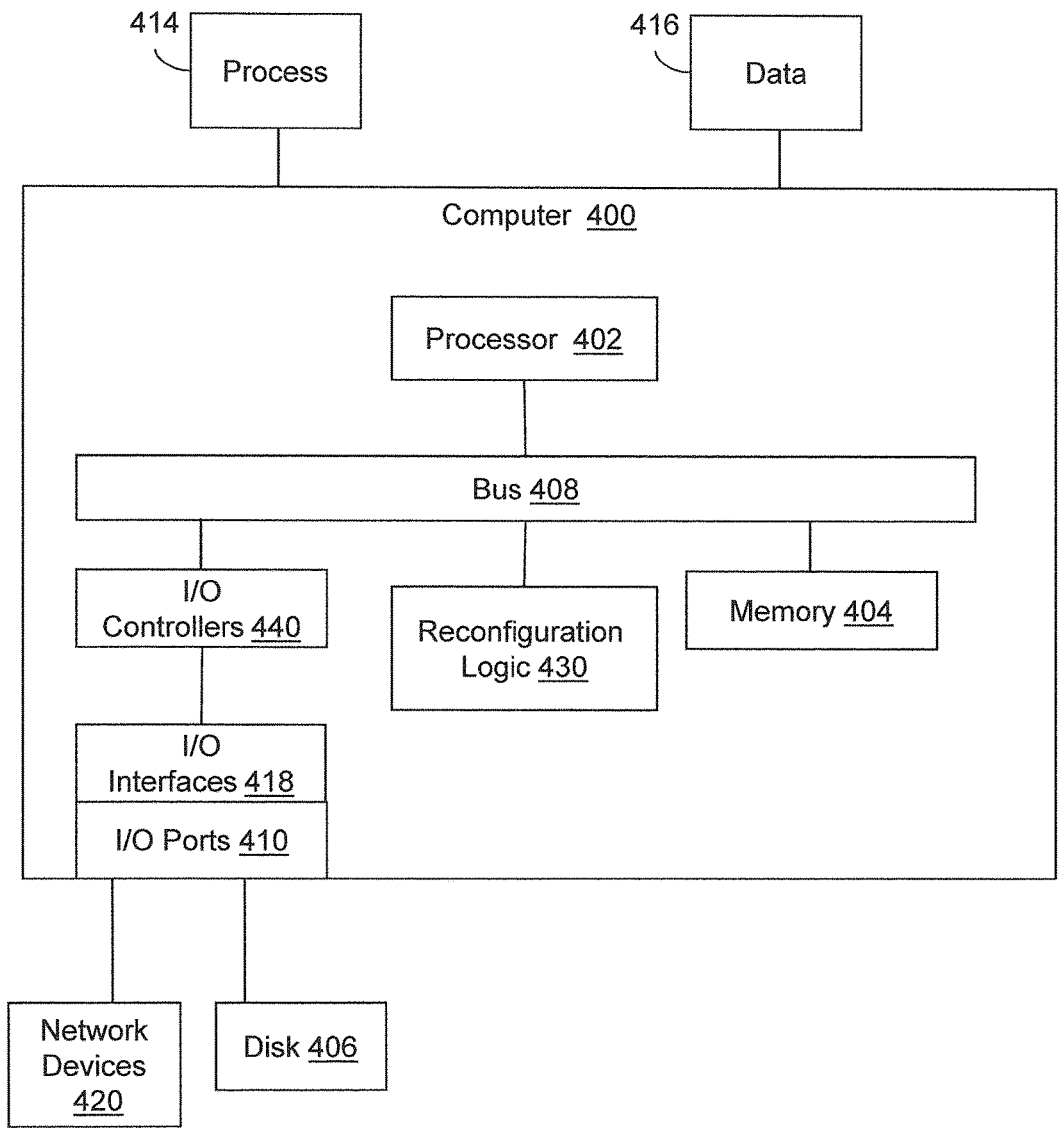
FIG. 4 illustrates an embodiment of a computing system configured to perform the methods of FIGS. 1, 2, and/or 3.

With reference to FIG. 4, one embodiment of a computing device 400 is illustrated that is configured and/or programmed to perform one or more of the example methods 100, 200, and/or 300 described herein, and/or equivalents. The example computing device may be a computer 400 that includes at least one processor 402, a memory 404, and input/output ports 410 operably connected by a bus 408. In one example, the computer 400 includes reconfiguration logic 430 configured to analyze executable code of an application and identify exception handling clauses as discussed previously. The reconfiguration logic 430 also modifies the executable code by reconfiguring the exception handling clauses (e.g., injecting code into a clause) to call a monitoring agent and pass data associated with an exception that occurs during execution of the executable code as discussed with reference to FIG. 1, 2, or 3. In other embodiments, reconfiguration logic 430 is configured to perform one or more of the functions/actions as described under method 100, 200, and/or 300. In one embodiment, the reconfiguration logic 430 is part of a monitoring agent described above that monitors the execution of an application. Thus the monitoring agent may be configured to perform both the reconfiguration of code (as described above) and the monitoring of the same code, and thus configured to perform the function of associating/linking exceptions with business transaction data collected from an executing application.

In different examples, the reconfiguration logic 430 may be implemented in hardware, a non-transitory computer-readable medium with stored instructions, firmware, and/or combinations thereof. The logic 430 may be a hardware component attached to the bus 408, may be implemented in the processor 402, or stored executable instructions in disk 406.

In one embodiment, the reconfiguration logic is configured to embed custom logic (e.g., selected executable code) into the executable code of a target software application so that re-programming of source code and re-compiling of the source code can be avoided. Modifying executable code requires no code change to the application source code or installed binaries on the file system. In one embodiment, byte-code instrumentation is used to dynamically modify the application's classes as they are being loaded into a Java Virtual Machine's (JVM's) memory at runtime. A static modification may be performed by statically modifying the binary class files on disk prior to runtime and then replacing the binary files in the file system with new binary files that contain the modified catch blocks or the application is instructed to use the new modified files instead of the original files.

In one embodiment, logic 430 or the computer 400 is a means (e.g., hardware, non-transitory computer-readable medium, firmware) for analyzing and modifying an application as described.

Generally describing an example configuration of the computer 400, the processor 402 may be a variety of various processors including dual microprocessor and other multi-processor architectures. A memory 404 may include volatile memory and/or non-volatile memory. Non-volatile memory may include, for example, ROM, PROM, and so on. Volatile memory may include, for example, RAM, SRAM, DRAM, and so on.

A storage disk 406 may be operably connected to the computer 400 via, for example, an input/output interface (e.g., card, device) 418 and an input/output port 410. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414 and/or a data 416, for example. The disk 406 and/or the memory 404 can store an operating system that controls and allocates resources of the computer 400.

The computer 400 may interact with input/output devices via the I/O interfaces 418 and the input/output ports 410. Input/output devices may be, for example, a keyboard, a microphone, a pointing and selection device, cameras, video cards, displays, the disk 406, the network devices 420, and so on. The input/output ports 410 may include, for example, serial ports, parallel ports, and USB ports.

The computer 400 can operate in a network environment and thus may be connected to the network devices 420 via the i/o interfaces 418, and/or the i/o ports 410. Through the network devices 420, the computer 400 may interact with a network. Through the network, the computer 400 may be logically connected to remote computers. Networks with which the computer 400 may interact include, but are not limited to, a LAN, a WAN, and other networks. Other hardware and/or electrical components may also be implemented in the computer 400.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated. The methods described and claimed herein are limited to statutory subject matter under 35 U.S.C § 101.

Definitions

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory storage medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other computer device from which a computer, a processor or other electronic device can read. Computer-readable medium described herein are limited to statutory subject matter that complies with 35 U.S.C § 101.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter that complies with 35 U.S.C § 101.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. § 101 and future versions and interpretations of the statute.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer including a processor cause the computer to programmatically:

search an executable code stored in a memory, using at least hardware of the computer, to identify a plurality of exception handling clauses within the executable code;

at each exception handling clause of the plurality of exception handling clauses identified in the executable code, insert into the executable code additional exception handling code as part of each of the exception handling clauses, wherein the additional exception handling code is configured (i) to collect information about an exception corresponding to the respective exception handling clause when the exception occurs during execution of the executable code, and (ii) to transmit the information about the corresponding exception to a monitoring agent;

check whether there is additional executable code to search after each time the additional exception handling code is inserted into one of the plurality of exception handling clauses; and terminate the search in response to the absence of additional executable code.

2. The non-transitory computer-readable medium of claim 1, further comprising instructions that when executed by the computer cause the computer to:

associate a business transaction with the exception after the exception occurs during execution of the executable code by associating data identifying a thread of execution for the executable code and data identifying a thread of execution for the business transaction.

3. The non-transitory computer-readable medium of claim 2, wherein the associating further comprises instructions that when executed by the computer cause the computer to:

monitor the execution of the executable code and collect data from business transactions;

in response to receiving a call from one of the additional exception handling code inserted as part of one of the plurality of exception handling clauses wherein the call includes the information about the exception, analyze context from the collected data and determining the business transaction that corresponds to the exception; and associate the exception to the corresponding business transaction.

4. The non-transitory computer-readable medium of claim 1, further comprising instructions that when executed by the computer cause the computer to search for and identify selected exception handling clauses including a plurality of try-catch blocks within the executable code and insert the additional exception handling code into the plurality of try-catch blocks.

5. The non-transitory computer-readable medium of claim 1, wherein the method further includes instructions that when executed by the computer cause the computer to perform filtering exceptions by:

capturing and reporting exceptions that are within a context of a business transaction, wherein if an exception is determined to not be part of the business transaction, the exception is filtered out and not reported; or comparing exceptions in failed business transactions against baseline healthy transactions, and applying domain knowledge to narrow or identify a root cause exception.

6. The non-transitory computer-readable medium of claim 1, wherein the searching and inserting are performed prior to the executable code being executed.

7. The non-transitory computer-readable medium of claim 1, wherein the additional exception handling code is configured to transmit the information about the exception to the monitoring agent by inserting byte code that calls the monitoring agent when the byte code is executed in response to the exception occurring; and wherein the byte code that calls the monitoring agent is programmed to call the monitoring agent that is an application that monitors executing applications, wherein the call is programmed to transmit the information about the exception to the monitoring agent.

8. The non-transitory computer-readable medium of claim 1, wherein the monitoring agent is an executable application that is separate from the executable code and wherein the monitoring agent is configured to determine whether to report the exception after receiving the information about the exception from the additional exception handling code.

9. A computer implemented programmatically executing method comprising:

searching, by at least a processor, executable code of an application and identifying a plurality of instances of code where each instance of code representing a try-catch block within the executable code; and modifying, by at least the processor, the executable code by inserting additional exception handling code as part of each of the identified try-catch blocks, wherein the additional exception handling code is configured to call a monitoring agent and pass data associated with a respective exception that occurs during execution of the executable code;

checking whether there is additional executable code to search after each time the additional exception handling code is inserted into one of the identified try-catch blocks; and terminating the searching in response to the absence of additional executable code.

10. The computer implemented method of claim 9, wherein the method further includes filtering exceptions by:

capturing and reporting exceptions that are within a context of a business transaction, wherein if an exception is determined to not be part of the business transaction, the exception is filtered out and not reported; or comparing exceptions in failed business transactions against baseline healthy transactions, and applying domain knowledge to narrow or identify a root cause exception.

11. A computing system comprising:

a processor configured to at least execute instructions;

a memory connected to the processor;

reconfiguration logic, implemented with at least hardware, and instructions that when executed by at least the processor cause the processor to programmatically:

search executable code of an application and identify an exception handling clause within the executable code;

in response to identifying the exception handling clause, modify the executable code by inserting additional exception handling code as part of the exception handling clause that calls a monitoring agent and passes data associated with an exception caught by the corresponding exception handling clause that occurs during execution of the executable code;

check whether there is additional executable code to search after each time the additional exception handling code is inserted into an exception handling clause;

terminate the search in response to the absence of additional executable code; and repeat the identifying and inserting for a plurality of exception handling clauses in the executable code until the entirety of the executable code has been searched.

12. The computing system of claim 11, wherein the reconfiguration logic is configured to modify the executable code by inserting bytecode as the additional exception handling code as part of the exception handling clause, wherein the bytecode is configured to call the monitoring agent when the byte code is executed in response to the exception occurring.

13. The computing system of claim 11, further comprising the monitoring agent configured to associate a business transaction with the exception caught by the exception handling clause after the exception occurs during execution of the executable code by associating data identifying a thread of execution for the executable code with data identifying a thread of execution for the business transaction.

14. The computing system of claim 11, wherein the monitoring agent is further configured to:

monitor the execution of the executable code and collecting data from business transactions;

in response to receiving the call from one of the additional exception handling code as part of the exception handling clause, wherein the call includes the data associated with the exception, analyze context from the collected data and determine the business transaction that corresponds to the exception; and associate the exception to the corresponding business transaction.

15. The computer implemented method of claim 9, wherein the modifying includes modifying the executable code at each of the plurality of try-catch blocks to insert additional exception handling code as part of the identified try-catch blocks to at least call the monitoring agent.

16. The computer implemented method of claim 9, further comprising:
associating a business transaction with the exception after the exception occurs during execution of the executable code by associating data identifying a thread of execution for the executable code with data identifying a thread of execution for the business transaction.

17. The computer implemented method of claim 16, wherein the associating further comprises:
monitoring, by the monitoring agent, the execution of the executable code and collecting data from business transactions;
in response to receiving the call from the additional exception handling code inserted into the executable code, wherein the call includes the data associated with the exception, analyzing context from the collected data and determining a business transaction that corresponds to the exception; and
associating the exception to the corresponding business transaction.

18. The computer implemented method of claim 9, further comprising searching for a specific instruction or code that represents the exception handling clause in the executable code.

19. The computer implemented method of claim 9, wherein each try-catch block identified in the executable code includes an original code for executing a first set of instructions; and wherein inserting the additional exception handling code adds a second set of instructions different than the first set of instructions.

20. The non-transitory computer-readable medium of claim 1, further comprising instructions that when executed by the computer cause the computer to:
search for a specific instruction or code that represents the exception handling clause in the executable code.

21. The non-transitory computer-readable medium of claim 1, wherein each exception handling clause identified in the executable code includes an original code for executing a first set of instructions; and
wherein the additional exception handling code is a second set of instructions different than the first set of instructions in a corresponding exception handling clause.

22. The non-transitory computer-readable medium of claim 1, wherein the method further includes instructions that when executed by the computer cause the computer to perform filtering exceptions by:
determining whether a portion of the executable code has been loaded into memory, and not searching the portion of the executable code if the portion of the executable code has not been loaded into memory; or
updating filtering logic based on data from previous exceptions to ignore benign exceptions.

23. The non-transitory computer-readable medium of claim 1, further comprising storing computer-executable instructions that when executed by the computer including the processor cause the computer to:
determine a type of instrumentation code to insert based on a type of the exception handling clause being modified for each of the plurality of exception handling clauses where code is inserted by selecting an appropriate code from a library of code.

24. The computer implemented method of claim 9, wherein the monitoring agent is configured to perform instrumentation filtering to decide which catch blocks to modify and which catch blocks not to modify based on filtering conditions including:
modifying only catch blocks that are relevant to a specified business transaction; and
modifying only catch blocks that are within methods relevant to a specified business transaction.

* * * * *